United States Patent [19]
Tomita et al.

[11] Patent Number: 5,245,465
[45] Date of Patent: Sep. 14, 1993

[54] OPTICAL POLARIZATION-STATE CONVERTING APPARATUS FOR USE AS ISOLATOR, MODULATOR AND THE LIKE

[75] Inventors: Yasuo Tomita, Yokohama; Hitoshi Oda; Masahiro Okuda, both of Sagamihara, all of Japan

[73] Assignee: Canon Kabushiki Kaisha, Tokyo, Japan

[21] Appl. No.: 939,427

[22] Filed: Sep. 4, 1992

Related U.S. Application Data

[63] Continuation of Ser. No. 739,260, Aug. 1, 1991, abandoned.

[30] Foreign Application Priority Data

Aug. 4, 1990 [JP] Japan .................. 2-207096
Aug. 9, 1990 [JP] Japan .................. 2-211253

[51] Int. Cl.$^5$ .................................... G02B 5/172
[52] U.S. Cl. ............................ 359/246; 359/249; 359/282; 359/283; 359/324; 385/11
[58] Field of Search ............. 359/246, 249, 282, 283, 359/324; 385/11

[56] References Cited

U.S. PATENT DOCUMENTS

| | | | |
|---|---|---|---|
| 3,526,854 | 9/1970 | Piller et al. | 332/7.51 |
| 4,220,395 | 9/1980 | Wang et al. | 385/6 |
| 4,387,953 | 6/1983 | Shirasaki et al. | 385/11 |
| 5,033,810 | 7/1991 | Inoue et al. | 359/328 |

FOREIGN PATENT DOCUMENTS 0361236 4/1990 European Pat. Off. .
61-123814 6/1986 Japan .
2-292887 12/1990 Japan .

OTHER PUBLICATIONS

Patent Abstracts of Japan, Kokai No. 60-235106, vol. 10, No. 102, Apr. 1986.
Nakamura, et al., "Propagation Characteristics in $Cd_{1-x}Mn_xTe$ Thin Films Prepared by ICB Method," IEEE Translation Journal on Magnetics in Japan, vol. 3, No. 7, Jul. 1988, pp. 597-598.
Tarucha, et al., "Waveguide-Type Optical Modulator of GaAs Quantum Well Double Heterostructures Using Electric Field Effect on Exciton Absorption," Japanese Journ. App. Phys., vol. 24, No. 6, Jun. 1985, pp. 442 through 444.
Yariv, et al., "Optical Waves in Crystals," John Wiley & Sons, 1984, five pages.

*Primary Examiner*—Paul M. Dzierzynski
*Assistant Examiner*—Kiet T. Nguyen
*Attorney, Agent, or Firm*—Fitzpatrick, Cella, Harper & Scinto

[57] ABSTRACT

In a polarization-state converting apparatus for use as an optical isolator, an optical modulator and the like, there are provided a waveguide including a magnetic semiconductor, a device for applying a magnetic field to the waveguide in a first predetermined direction, a device for applying an electric field to the waveguide in a second predetermined direction, and a mode conversion is caused via electrooptic and magnetooptic effects due to the electric and magnetic fields to change the polarization state of light propagating through the waveguide. When used as an optical isolator, the optical isolation is performed to compensate for degradation of the mode conversion rate due to a phase mismatch between light incident upon the waveguide and light emerging from the waveguide. When used as an optical modulator, the optical modulation of light emerging from the waveguide is performed by varying the electric field and an optical isolation function is effected while compensating for degradation of the mode conversion rate due to a phase mismatch between light incident upon the waveguide and light emerging from the waveguide.

21 Claims, 10 Drawing Sheets

ISOTROPIC MATERIAL

CASE WHERE STRESS IS APPLIED IN DIRECTION NORMAL TO FILM SURFACE (x - AXIS)

① PATH IN THE CASE OF $\Delta \beta = 0$

② PATH OF THIS INVENTION

① PATH IN THE CASE OF $\Delta \beta = 0$

② PATH OF THIS INVENTION IN THE CASE OF PLUS ELECTRIC FIELD : $\theta_E = -\Delta \beta / 2$ ③ PATH OF THIS INVENTION IN THE CASE OF MINUS ELECTRIC FIELD : $\theta_E = \Delta \beta / 2$.

OPTICAL POLARIZATION-STATE CONVERTING APPARATUS FOR USE AS ISOLATOR, MODULATOR AND THE LIKE

This application is a continuation of prior application, Ser. No. 07/739,260 filed Aug. 1, 1991, now abandoned.

BACKGROUND OF THE INVENTION

1. Field of the Invention

This invention relates to an optical polarization-state converting apparatus which can be applied to an optical isolator for use in for example, a semiconductor laser device utilized in optical communications equipment, information processing systems, measurement instruments, etc., for preventing noise caused by return light. The present invention also relates to a semiconductor laser device including such an optical isolator, and to an optical modulator including such an optical isolator.

2. Related Background Art

In recent years, the speed of optical data transmission has become faster and faster, and the capacity of information recording has become greater and greater. For this purpose, optical fiber communication and the optical disc memory have been developed. As optical communication systems, there exist medium and long distance transmission systems wherein the long distance systems use wavelengths of 1.3 or 1.5 $\mu$m, and the short or medium distance systems (e.g. a local area network (LAN) and so forth) which use wavelengths of 0.8 $\mu$m.

In either case, light from a semiconductor laser is condensed onto the end surface of an optical fiber and is propagated through the fiber. In this case, however, light reflected by end surfaces of the fiber and other optical components returns to the active layer of the semiconductor laser, and as a result the oscillation of the semiconductor laser becomes unstable and fluctuations of power and wavelength occur. Particularly, in a distributed Bragg reflection type laser diode(DBR-LD), there occur such large fluctuations that a single mode is sometimes changed to a multimode. Further, in coherent optical communications systems which are proposed for future communication systems, negative influences caused by such return light are especially disadvantageous since only the phase is changed without on/off modulation of the light.

In optical disc memories, light reflected from a disc substrate in addition to that reflected from optical components returns to the semiconductor laser, and induces the above-noted unstable oscillation and noise problems. The occurrence of such noise will increase the error rate of transmission signals in an optical communication system and will degrade the signals reproduced from the optical disc memory.

The optical isolator is the only device for preventing the return light from reaching the semiconductor laser. The optical isolator has an irreversible or nonreciprocal transmittance property, and completely cuts off the return light to prevent the return light from reaching the active layer in the semiconductor laser. Presently, the optical isolator has the following two problems.

One is the problem of a wavelength range. As shown in FIG. 1, the conventionally used optical isolator utilizes a magnetic garnet single crystal 1 such as YIG as a Faraday rotating element. The absorption edge of garnet lies at about 1 $\mu$m of wavelength. So the garnet is transparent for the wavelength range of 1.3 or 1.5 $\mu$m which is used in the long distance optical communication system, but the light absorption of garnet is large for light in the wavelength range (0.8 $\mu$m band) which is used in the short distance optical communication system or in the optical disc memory. Therefore, in the wavelength range of 0.8 $\mu$m, only an optical isolator in which a $\lambda$/4 plate and a polarization beam splitter are combined is used. The isolation ratio obtained by this isolator is at most only about 20 dB. The isolation ratio would be smaller if the plane of polarization in the return light will be changed. Further, this type of isolator cannot be used in the system in which the rotation (i.e., Kerr rotational angle or Faraday rotational angle) of the polarization plane in light reflected by or transmitted through a disc (such a magneto-optical disc) is detected as a signal.

The other problem is that the conventional isolator is hard to integrate with other optical devices. The optoelectronic integrated circuit (OEIC) or optical integrated circuit has been developed for obtaining such devices that have high-speed operation and high efficiency. In these devices, GaAs, InP and the like are formed in a compound semiconductor substrate to produce optical devices such as semiconductor lasers. For this purpose, it is required to integrate the optical isolator on the compound semiconductor substrate. While a film of the magnetic garnet itself can be grown by liquid phase epitaxy or sputtering, a magnetic garnet film of high quality cannot be grown on such a substrate since the magnetic garnet differs from the GaAs or InP substrate in lattice constant and in coefficient of thermal expansion. Thus, it is difficult to integrate the optical isolator with other optical elements so long as the magnetic garnet film is used as the Faraday material.

As is known from the above, an optical isolator which can operate in a short wavelength range (i.e., 0.8 $\mu$m band) and can be easily integrated with other optical devices would be desirable.

To achieve this purpose, there is disclosed in Japanese Patent Application No. 2-292887, or an integrated-type optical isolator that uses a magnetic semiconductor as the Faraday material, as shown in FIG. 2. It is known that in the magnetic semiconductor CdMnTe the site of Cd in the II-VI group compound semiconductor CdTe is replaced by Mn, and is transparent for the visible range of light and has a great Faraday rotation angle. CdTe can be grown on a GaAs substrate by molecular beam epitaxy (MBE) or metal organic chemical vapor deposition (MOCVD) as a high-quality film. As shown in FIG. 2, such an isolator comprises a CdTe buffer layer 10, a cladding layer 11, a waveguide layer 12 and a cladding layer 13. These elements of the optical isolator 14 can be formed on a common substrate 15 together with a DBR laser part 16, which includes a lower cladding layer 17, an active layer 18, an upper cladding layer 19, a waveguide layer 20, a cladding layer 21, a contact layer 22, corrugations 23, a p-side electrode 24, an n-side electrode 25, and a metal film 26 for acting as a polarizing plate.

The integrated-type isolator using the magnetic semiconductor CdMnTe has solved the above-discussed problems, but this isolator also has the following problem.

Phase matching is needed between the transverse electric (TE) wave and transverse magnetic (TM) wave in order to produce an effective waveguide type optical isolator as shown in FIG. 2. FIGS. 3A-3C illustrate the way to obtain phase matching. When a laser light propagates through a film in a z-direction as shown in FIG.

3A, the refractive index $n_{TE}$ for the TE wave is larger than the refractive index $n_{TM}$ for the TM wave when the film thickness $h_o$ is finite. This difference is illustrated in FIG. 3B, and is due to shape double refraction. Provided that the propagation constant difference between the TE and TM waves is $\Delta\beta$, then $$\Delta\beta = 2\pi/\lambda \cdot (n_{TE} - n_{TM}) \tag{1}$$

The mode conversion rate R from TE wave to TM wave is given by $$R = \theta_F^2/\{\theta_F^2 + (\Delta\beta/2)^2\} \cdot \sin^2[\{\theta_F^2 + (\Delta\beta/2)^2\}^{\frac{1}{2}} \cdot l] \tag{2}$$

where $\theta_F$ is a Faraday rotation angle per unit length and l is the waveguide length. From this, it is learned that the condition $\Delta\beta = 0$ or $n_{TE} = n_{TM}$ is necessary in order to increase the mode conversion rate. Here, since the mode is quantized by the waveguide film, rotation of the polarization plane in a propagating light is exhibited by the mode conversion rate.

The equation (2) is derived according to, e.g., a method described in "Optical Waves In Crystal" written by A. Yariv and P. Yeh, published by John Wiley & Sons, as follows:

$$\nabla \times E + \partial B/\partial t = 0 \tag{2-1}$$

$$\nabla \times H + \partial D/\partial t = J \tag{2-2}$$

$$\nabla \cdot D = \rho \tag{2-3}$$

$$\nabla \cdot B = 0 \tag{2-4}$$

From Maxwell equations represented by the formulas (2-1)-(2-4), the following wave equation given by a formula (2-5) is derived $$\nabla \times (1/\mu \nabla \times E) + \epsilon \partial^2 E/\partial t^2 = 0 \tag{2-5}$$

Provided that $E \propto \exp(i\omega t)$ is satisfied in the formula (2-5), the following formula (2-6) is obtained $$\nabla \times (\nabla \times E) - \omega^2 \mu (\epsilon + \Delta\epsilon) E = 0 \tag{2-6}$$

From the formula (2-6), mode equations represented by the following formulas (2-7) and (2-8) are derived $$dA_1/d\zeta = (i\omega^2 \mu)/(2k_1) \cdot \{\Delta\epsilon_{11} A_1 + \Delta\epsilon_{12} A_2 \exp[-i(k_1 - k_2)\zeta]\} \tag{2-7}$$

$$dA_2/d\zeta = (\omega^2 \mu)/(2k_2) \cdot \{\Delta\epsilon_{21} A_1 \exp[i(k_2 - k_1)\zeta] + \Delta\epsilon_{22} A_2\} \tag{2-8}$$

The formula (2) is derived by substituting diagonal components $(\Delta\epsilon_{11}, \Delta\epsilon_{22}) = 0$ and off-diagonal components $\Delta\epsilon_{12}/\epsilon = 2n \Delta n - iG$, $\Delta\epsilon_{21}/\epsilon = 2n \Delta n + iG$ into the above formulas (2-7) and (2-8).

For this purpose, as is shown in FIG. 3C, attempts have been made to achieve the relation $n_{TE} = n_{TM}$ at a certain film thickness $h_o$ by causing the waveguide to have an anisotropic property in a direction normal to the film surface (x-axis). In the case of garnet film, attempts have been made to bring forth a strain-induced double refraction property utilizing the lattice constant difference between the substrate and film (waveguide), or a growth-induced double refraction property by controlling the temperature and fraction mole in the process of film growth. Further, there is a technique for forming a grating along a light propagating direction in order to compensate for the propagation constant difference.

However, the above methods require strict control of the growth and processing conditions, and once those methods were implemented, processing adjustments would be virtually impossible. Thus, those methods are believed to be impractical.

In addition to the optical isolator, another important device is an optical modulator for increasing the bit rate in an optical communications system, and for enhancing the write-in and read-out speeds in optical disc memories.

When the semiconductor laser is modulated at a high speed in optical communications systems, the spectrum width of unwanted oscillated lights will be widened and long distance transmission will become difficult due to the wavelength dispersion in the fibers. To overcome this drawback, a method has been developed in which the semiconductor laser is dc-driven and light therefrom is pulse-modulated by an external optical modulator.

FIG. 4 shows an example in which the semiconductor laser and optical modulator are integrated (see, for example, Jpn. J. Appl. Phys. vol. 24(1985)L442). A laser part 30 and a modulator part 31 have the same p-i-n structure. These parts 30 and 31 are electrically separated by a groove 32, but waveguides of the parts 30 and 31 are optically coupled. Therefore, light emitted from the laser part 30 is incident upon the waveguide of the modulator part 31, and emerges after propagating a given distance. When the light propagates through the waveguide of the modulator part 31, the light quantity is reduced due to light absorption. The absorption coefficient of a multiple quantum well (MQW) layer or the waveguide can be modulated by controlling the application of a reverse-bias with a quantum confinement Stark effect (QCSE). As a result, the intensity of the emerging light from the modulator part 31 can be modulated.

In present optical systems depicted in FIG. 5, the above-discussed two devices (optical modulator 41 and isolator 42) must be serially arranged along the light path. Therefore, the insertion loss is twice as much, and the size of the components becomes large. Further, when those devices are to be integrated with the semiconductor laser 43, devices having different layer structures must be fabricated on a common substrate, as a result of which the process for fabrication will be complicated. Thus, it is desired to provide a single device which acts as an optical isolator and a modulator, and can be integrated with a semiconductor laser.

SUMMARY OF THE INVENTION

An object of the present invention is to provide an optical polarization-state converting apparatus which can be applied to an optical isolator, an optical modulator and the like.

Another object of the present invention is to provide an optical isolator which is capable of a full mode conversion without producing a phase matching between different modes.

Still another object of the present invention is to provide an optical modulator which also functions as an optical isolator producing no problem of phase mismatch.

According to one aspect of the optical polarization-state converting apparatus of this invention, the apparatus includes a waveguide comprising a magnetic semiconductor; means for applying a magnetic field to the waveguide in a first predetermined direction; and means for applying an electric field to the waveguide in a second predetermined direction; whereby a mode conversion is caused, via electrooptic and magnetooptic effects due to the electric and magnetic fields, to change the polarization state of light propagating through the waveguide.

According to another aspect of the present invention, an optical isolator includes a waveguide comprising a magnetic semiconductor; means for applying a magnetic field to the waveguide in a first predetermined direction; and means for applying an electric field to the waveguide in a second predetermined direction; whereby a mode conversion is caused via electrooptic and magnetooptic effects due to the electric and magnetic fields while compensating for degradation of the mode conversion rate due to phase mismatch between light incident upon the waveguide and light emerging from the waveguide.

According to a further aspect of the present invention, an optical modulator includes a waveguide comprising a magnetic semiconductor; means for applying a constant magnetic field to the waveguide in a first predetermined direction; means for applying an electric field to the waveguide in a second predetermined direction, the electric field being modulated according to a signal; whereby a mode conversion is caused, via electrooptic and magnetooptic effects due to the electric and magnetic fields, to perform the optical modulation of light emerging from the waveguide and to perform an optical isolation function while compensating for degradation of the mode conversion rate due to phase mismatch between light incident upon the waveguide and light emerging from the waveguide.

These advantages and others will be more readily understood in connection with the following detailed description of the preferred embodiment in conjunction with the drawings.

DESCRIPTION OF THE PREFERRED EMBODIMENT

Figure 6:
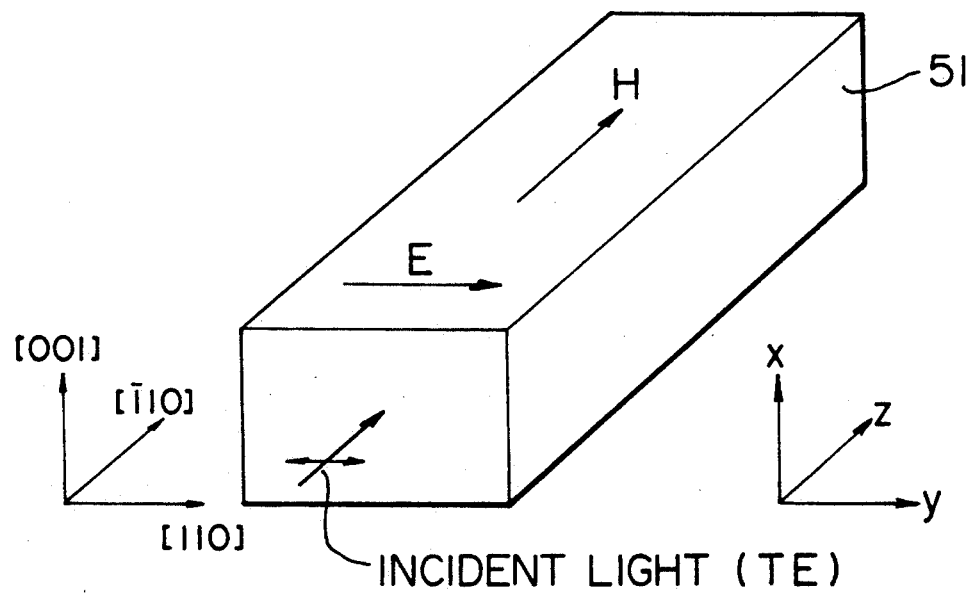
FIG. 6 is a view for explaining the principle of the present invention.

The principle of the present invention will be explained hereinbelow with reference to FIG. 6. The magnetic semiconductor (such as a II-VI group compound semiconductor including Fe or Mn, e.g., CdMnTe) which forms a waveguide 51 is a material which exhibits both the magneto-optic effect and the electro-optic effect. As shown in FIG. 6, an electric field E is applied in a direction [110] of a zinc-blende structure, and at the same time a magnetic field H is applied in a direction [$\bar{1}$10] of the same zinc-blende structure. Here, the CdMnTe layer 51 is formed on a GaAs (001) substrate. The coordinate system is given as shown in FIG. 6, and refractive indices in directions of the x, y and z axes are represented by $n_{TM}$, $n_{TE}$ and n, respectively.

The use of the terms TE wave and TM wave is correct only in the case of a waveguide which is a slab-type waveguide which extends in a plane that can be considered infinite. However, here a plane wave polarized in the x-direction is called a TM wave, and a plane wave polarized in the y-direction is called a TE wave. Further, the mode coupling between TE and TM waves is considered to occur in this case.

The refractive index is isotropic in the cubic system of a zinc-blende structure, such as CdMnTe, but if this structure is made as a thin film, double refraction will occur, and $n_{TM}$ and $n_{TE}$ will differ from each other. The dielectric constant tensor $\epsilon$ is given by $$\epsilon/\epsilon_o = \begin{pmatrix} n_{TM}^2 & 0 & 0 \\ 0 & n_{TE}^2 & 0 \\ 0 & 0 & n^2 \end{pmatrix} + \begin{pmatrix} 0 & 2n\Delta n & 0 \\ 2n\Delta n & 0 & 0 \\ 0 & 0 & 0 \end{pmatrix} + \begin{pmatrix} 0 & -iG & 0 \\ iG & 0 & 0 \\ 0 & 0 & 0 \end{pmatrix} \quad (3)$$

where $\epsilon_o$ is a dielectric constant in a vacuum, $\Delta n$ is a change in the reflective index due to the electric field E. This change $\Delta n$ can be represented by:

$$\Delta n = n^3 \cdot \gamma_{41} \cdot E/2 = \lambda/2\pi \cdot \theta_E \quad (4)$$

using a lead angle in phase $\theta_E$ and the electro-optic coefficient $\gamma_{41}$. Further, G is an amount which shows the magnitude of the magneto-optic effect, and has a relation with the Faraday rotation angle $\theta_F$ and the Verdet contstant V, as follows:

$$G = \lambda n/\pi \cdot \theta_F = \lambda n/\pi \cdot VH \quad (5)$$

The mode coupling equation between TM and TE waves is solved using the equation (3) of the dielectric constant tensor, yielding:

$$A_{TM}(z) = A_{TM}(0)\{\cos(sz) + i \cdot (\Delta\beta/2)/s \cdot \sin(sz)\} - (\theta_F - i\theta_E)/s \cdot A_{TE}(0) \sin(sz) \quad (6)$$

$$A_{TE}(z) = A_{TE}(0)\{\cos(sz) - i \cdot (\Delta\beta/2)/s \cdot \sin(sz)\} + (\theta_F + i\theta_E)/s \cdot A_{TM}(0) \sin(sz) \quad (7)$$

where $A_{TM}(z)$ is a complex amplitude of the TM wave, $A_{TE}(z)$ is a complex amplitude of the TE wave. $\Delta\beta$ is the propagation constant difference between the TE and TM waves and is given by the equation (1), and s is represented by:

$$s = \{(\Delta\beta/2)^2 + \theta_F^2 + \theta_E^2\}^{\frac{1}{2}} \quad (8)$$

As is shown in FIG. 6, if the TE wave enters CdMnTe waveguide 51, namely, $A_{TE}(0)=1$ and $A_{TM}(0)=0$, the equations (6) and (7) are rewritten as:

$$A_{TM}(z) = -(\theta_F/s)\cdot\sin(sz) + i(\theta_E/s)\cdot\sin(sz) \quad (9)$$

$$A_{TE}(z) = \cos(sz) - i(\Delta\beta/2)/s\cdot\sin(sz) \quad (10)$$

Here, the condition for rotating the plane of polarization exactly by 45 degrees, i.e., the mode conversion rate R is 50%, is given by:

$$A_{TE}(z) = A_{TM}(z) \quad (11)$$

From this, conditions wherein a real part in the equation (9) is equal to that in the equation (10) and wherein an imaginary part in the equation (9) is equal to that in the equation (10), are required, yielding:

$$\begin{cases} \tan(sz) = -s/\theta_F \\ \theta_E = \Delta\beta/2 \end{cases} \quad (12)$$

It is known therefrom that only if the conditions (12) are met, a linearly polarized light will be converted to light whose polarization plane has been rotated by 45 degrees from that in the former linearly polarized light even if the above-mentioned condition for phase matching (i.e., $\Delta\beta=0$) would not be satisfied.

Figure 7:
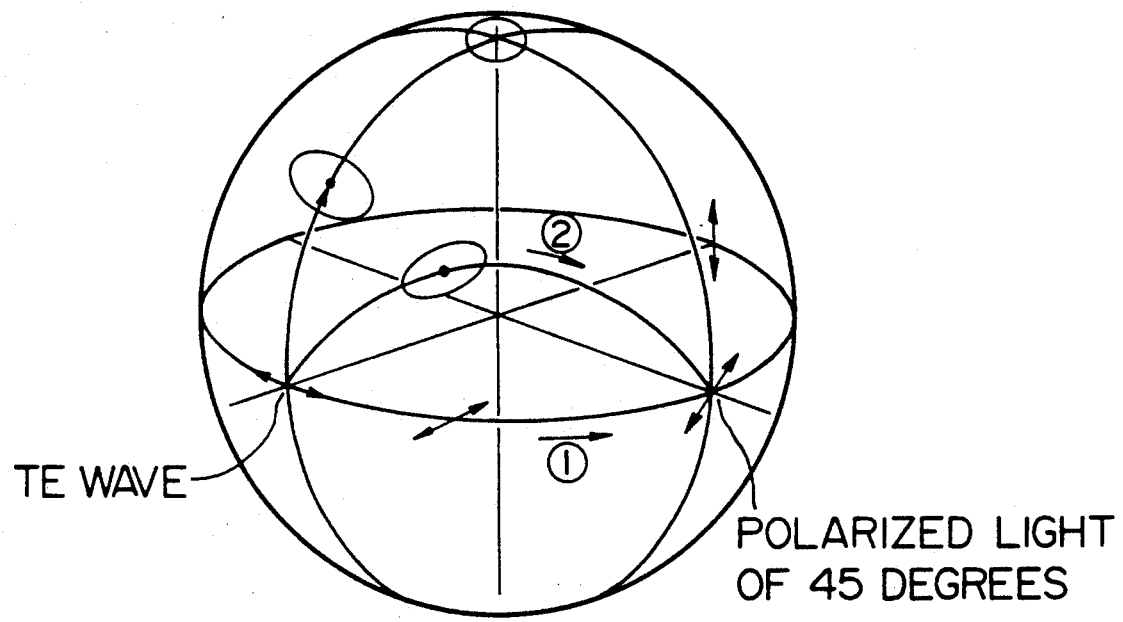
FIG. 7 is a view of a Poincare sphere for comparing the optical isolator of this invention with a prior art isolator.

FIG. 7 shows the comparison of rotations of polarization plane between cases where the condition for phase matching is met and where the equation (12) is met, using the Poincare sphere. When the phase matching is established ($\Delta\beta=0$), only the angle of the polarization plane is changed, always maintaining the state of a linearly polarized light (see the path ①). In contrast, in the case of equation (12), it is known from FIG. 7 that there appears an elliptically polarized wave at places other than those of 0° and 45° linearly polarized light (see the path ②).

Thus, in the optical isolator of this invention, the plane of polarization is rotated by 45 degrees by applying a proper electric field E as well as a magnetic field H, even if the phase matching ($\Delta\beta=0$) is not established. As a result, strict controls are not needed in the growth and process of the waveguide.

Using the relation among the equations (9), (10) and (11), it can be said that the equation (9) is caused to have a non-zero imaginary part by applying the electric field E to meet $\Delta n \neq 0$ or $\theta_E \neq 0$ (see the equation (4)), so that the imaginary part in equation (10) does not need to be zero, and so that even if $\Delta\beta \neq 0$, the equation (11) can be satisfied.

Next, the principle of an optical modulator which has an optical isolator function according to the persent invention will be explained hereinbelow.

The operating principle of the optical isolator is the same as the above explanation. For the purpose of the isolator, there is provided, on the side of the light emission, an analyzer whose optical axis is rotated 45 degrees, so that such linearly polarized light which is rotated 45 degrees passes through this analyzer. Return light is prevented by a polarizer disposed on the side of incidence, since the return light rotates a further 45 degrees as it travels in the crystal 51 in the opposite direction through the analyzer, and the return light forms an angle of 90 degrees relative to the incident light. Thus, the functions of an optical isolator are effected.

Next, a voltage is applied which has the same magnitude as and has a minus (opposite) direction to that in the equation (12). For simplicity, the following case is considered:

$$\theta_F(=VH) = \theta_E(=\pi n^3\gamma_{14}(-E)/\lambda) = \Delta\beta/2 \quad (13)$$

Generality is not lost even if the equation (13) is required, because the first condition in the equation (12) and the equation (13) both can be satisfied by properly setting V, H (constant), the propagation length l, etc.

Figure 8:
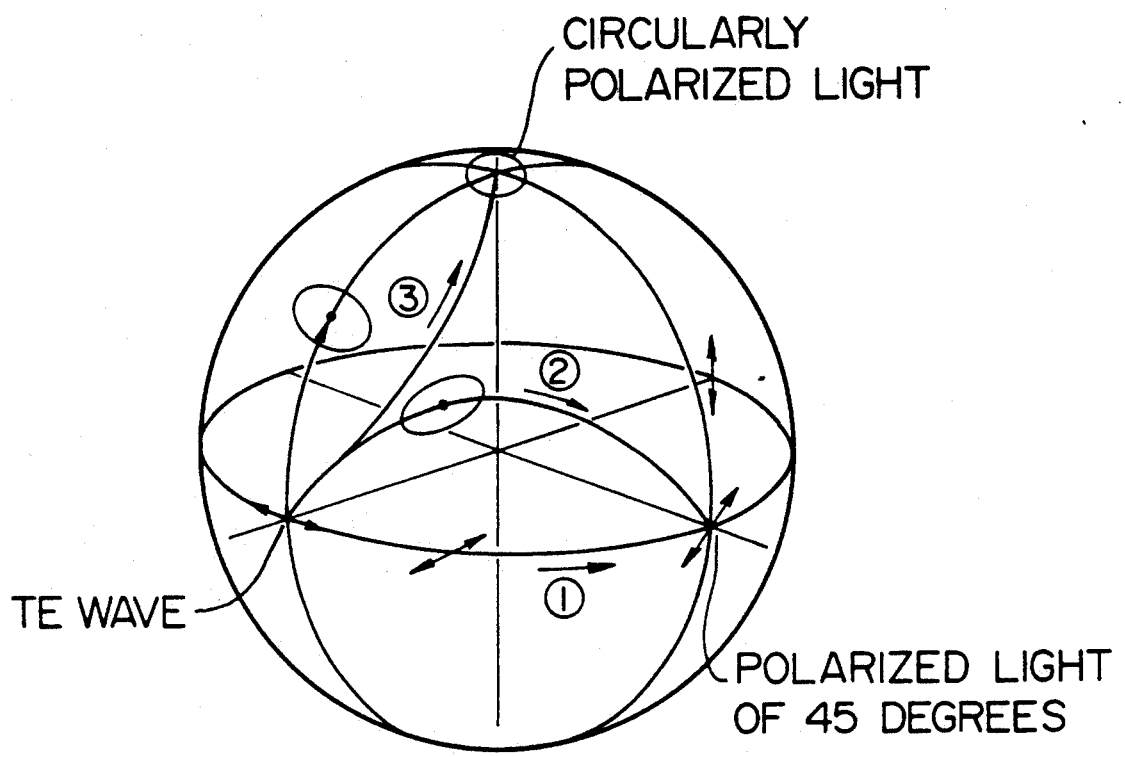
FIG. 8 is a view of a Poincare sphere for comparing the optical modulator of this invention with a prior art modulator.

When the equation (13) is met, a light wave given by the equations (9) and (10) represents a circularly polarized light. That is, when the magnetic field is kept constant and the electric field has a minus direction, the TE light which is a linearly polarized light having an angle of zero degrees is changed to circularly polarized light via an elliptically polarized light. If this is explained using the Poincare sphere, the TE wave follows a line of ③ in FIG. 8 and comes to the position of a pole which corresponds to a circularly polarized light.

When this circularly polarized light is incident upon the analyzer disposed on the emission side, light modulation of 50% is performed compared to the case where the equation (12) is satisfied and light is transmitted through the analyzer without loss. At this time, the optical isolation is not carried out, but it is no problem if the oscillation of the semiconductor laser is fluctuated a little, since there is no signal light.

Thus, switching is effected between linearly polarized light whose rotation angle is 45 degrees and circularly polarized light by switching the voltage between plus and minus. An analyzer having an angle of 45 degrees is disposed on the side of emission and makes it possible to conduct optical modulation of 50% while optical isolation is performed when necessary.

Figure 9:
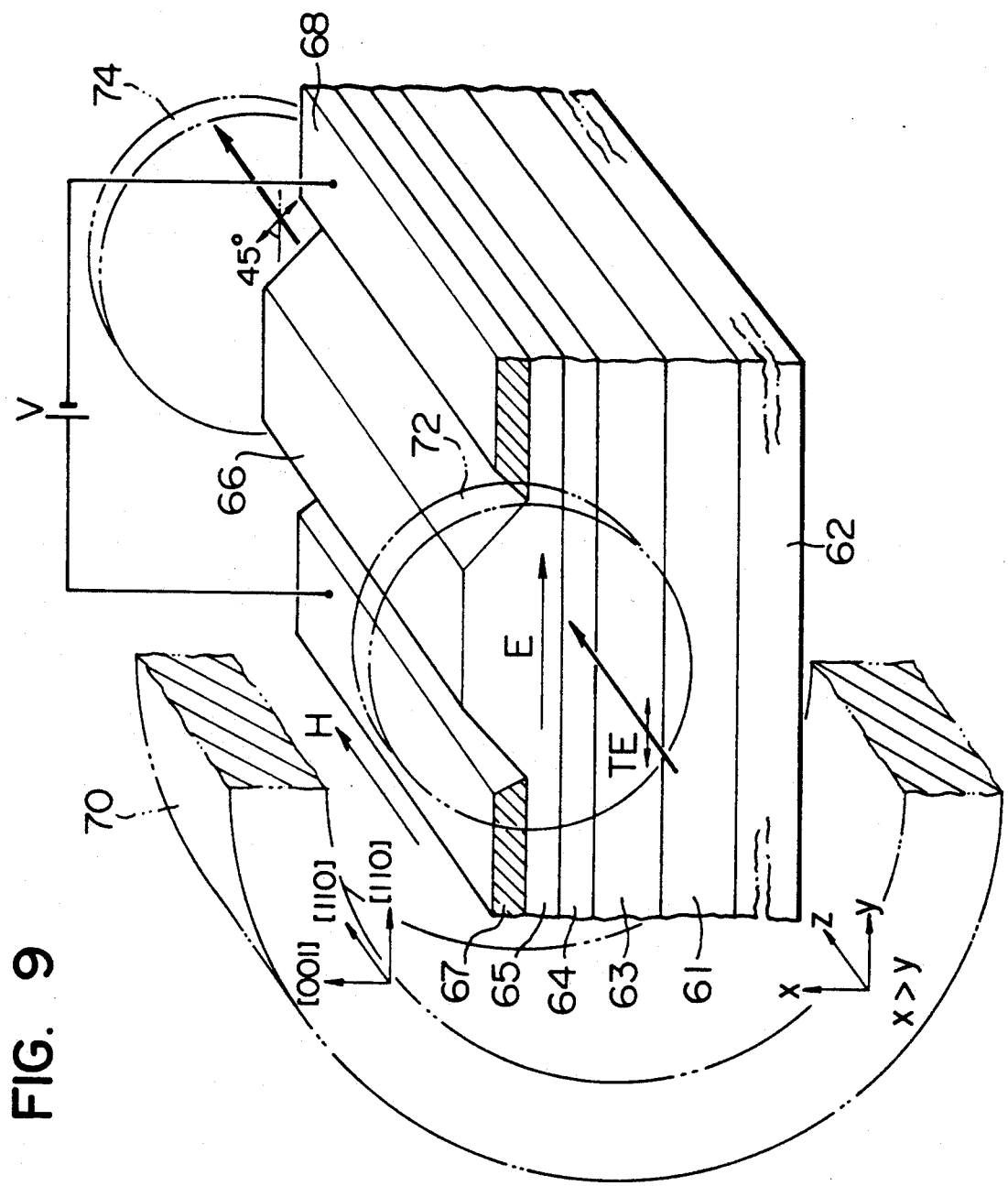
FIG. 9 is a schematic view of an embodiment of the optical isolator according to the present invention.

FIG. 9 shows an embodiment of the optical isolator according to this invention. In FIG. 9, a buffer layer 61 of CdTe is formed on a semi-insulating GaAs (001) substrate 62 by an MBE process. If appropriate growth conditions are selected, the layer 61 is grown in the same direction as the surface orientation of the substrate 62. On the layer 61 a waveguide structure is fabricated using CdMnTe layers 63, 64 and 65 having two different mole fractions x, y of an Mn constituent component. The mole fraction of Mn in the core portion 64 is made larger than that of the upper and lower cladding portions 63 and 65 (i.e., y < x), so that the refractive index of the core portion 64 is made greater than that of the cladding portions 63 and 65 to form a light confinement structure.

Then, the upper cladding portion 65 is etched to form a mesa structure 66, and a channel waveguide is formed. The longitudinal direction of this mesa is along the [$\bar{1}$10] axis and a direction normal thereto is made the [110] axis. Electrodes (In/Au) 67 and 68 are deposited on both sides of the mesa 66, so that the electric field E can be applied in the direction of the [110] axis using voltage source.

In the above structure, the magnetic field H is applied by a permanent magnet 70 in a propagation direction of the channel 66 or the direction of the [$\bar{1}$10] axis, and thus, the relationship of the external fields E and H with the crystal axis of the waveguide is as shown in FIG. 9.

A polarizer 72 is shown schematically disposed on the side of light incidence of the waveguide while an analyzer 74 is shown schematically disposed on the side of light emission of the waveguide.

Figure 1:
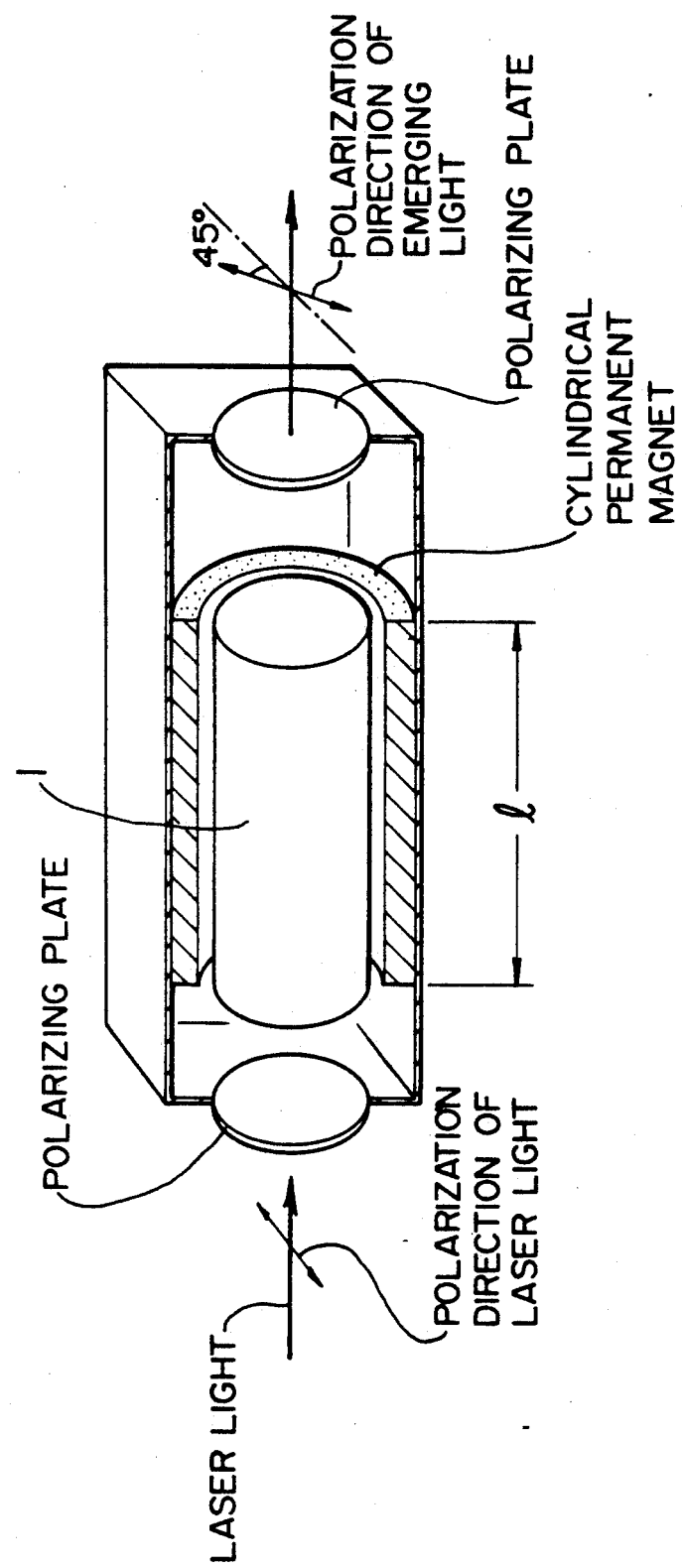
FIG. 1 is a schematic representation of a prior art optical isolator.
Figure 2:
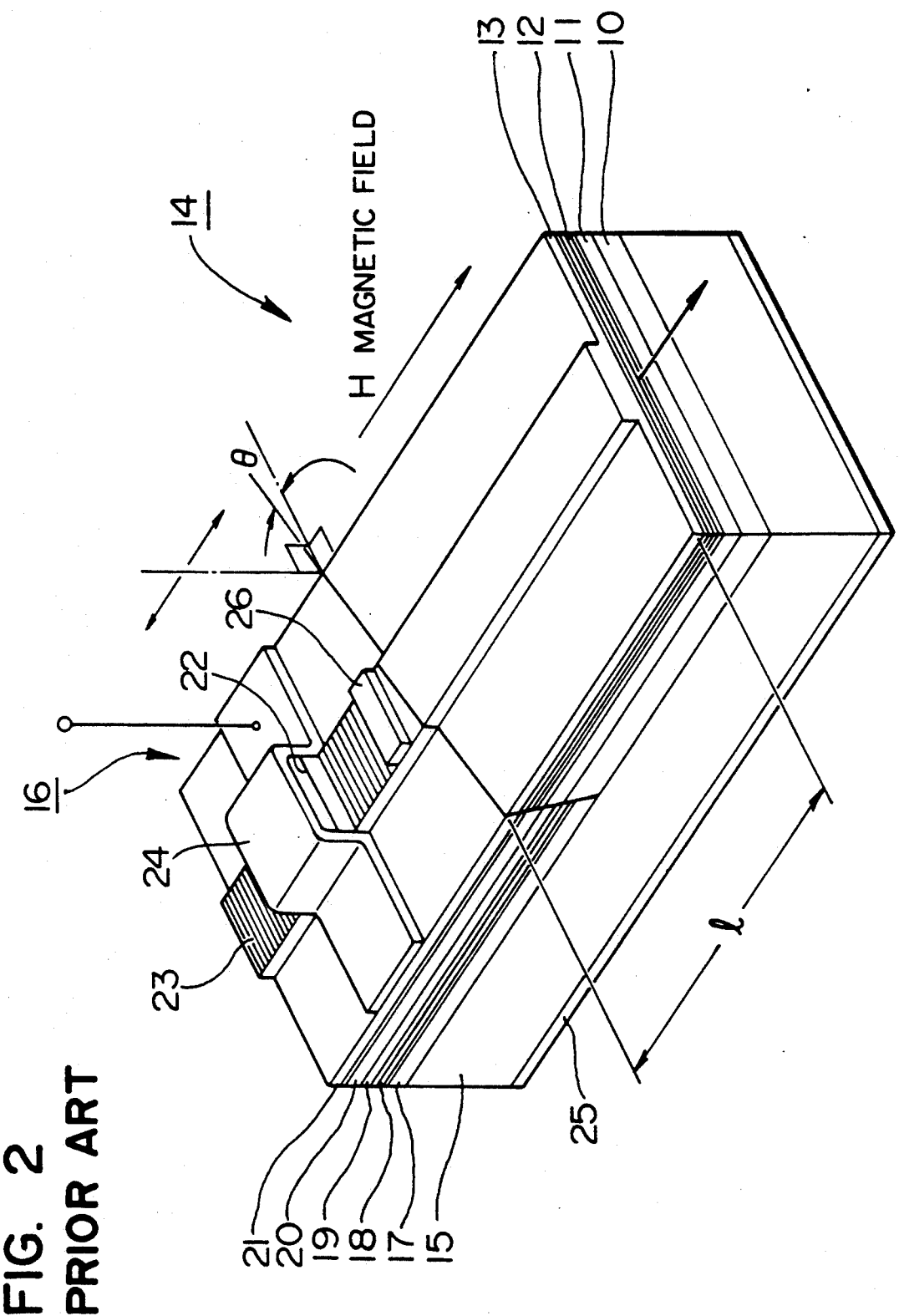
FIG. 2 is a view showing a structure of the example disclosed in the Japanese Patent Application No. 2-292887.
Figure 3A:
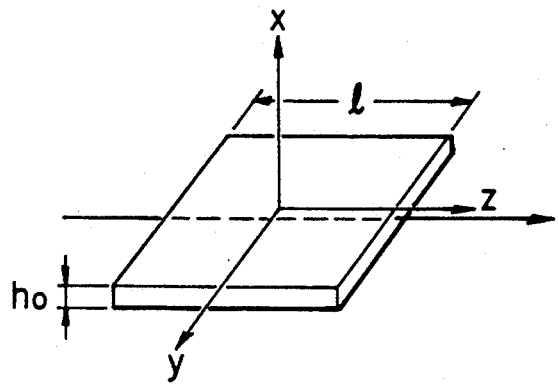
FIGS. 3A-3C are views illustrating a prior art way to reduce the propagation constant difference.
Figure 3B:
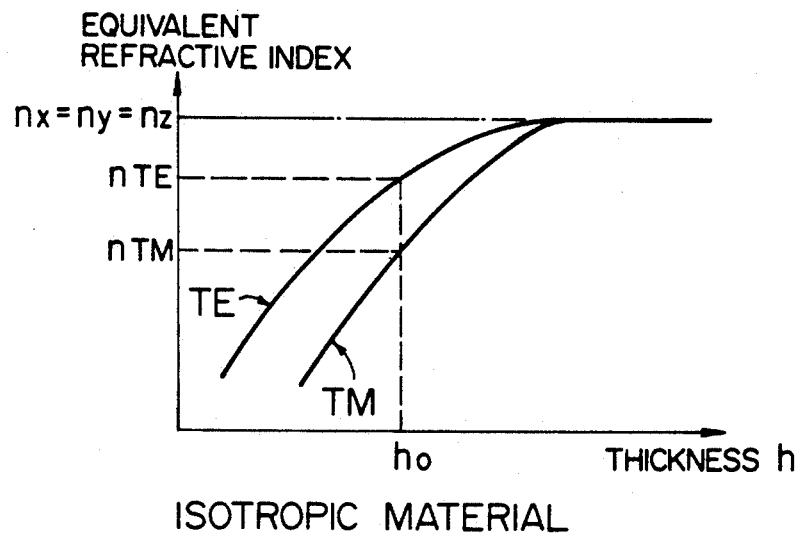
Figure 3C:
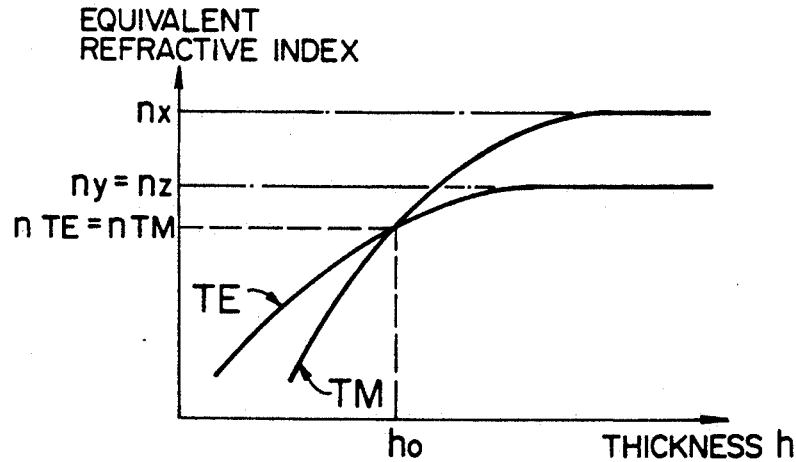
Figure 4:
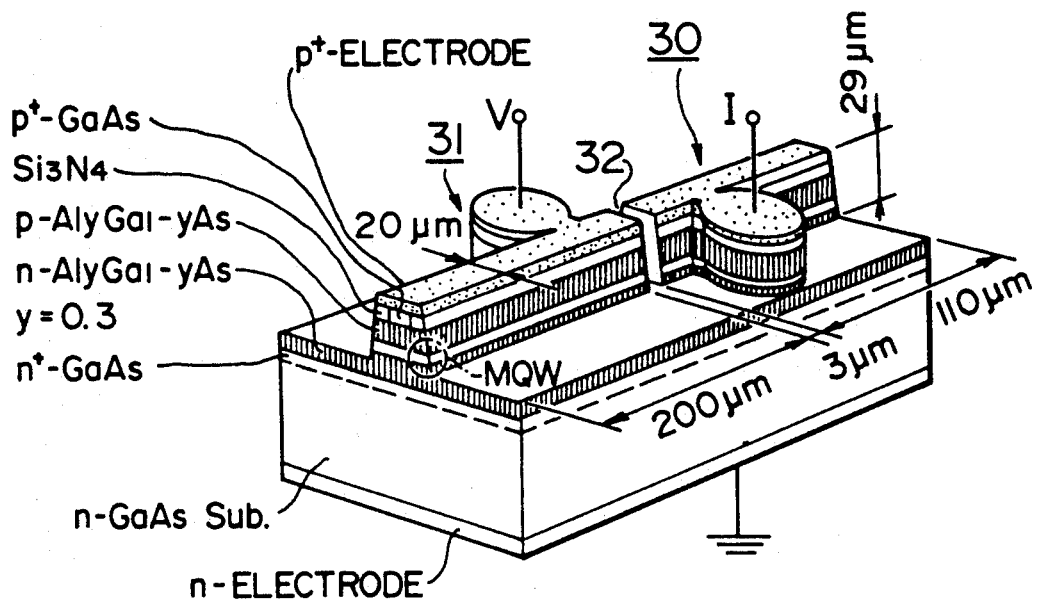
FIG. 4 is a schematic representation of a prior art optical modulator.
Figure 5:
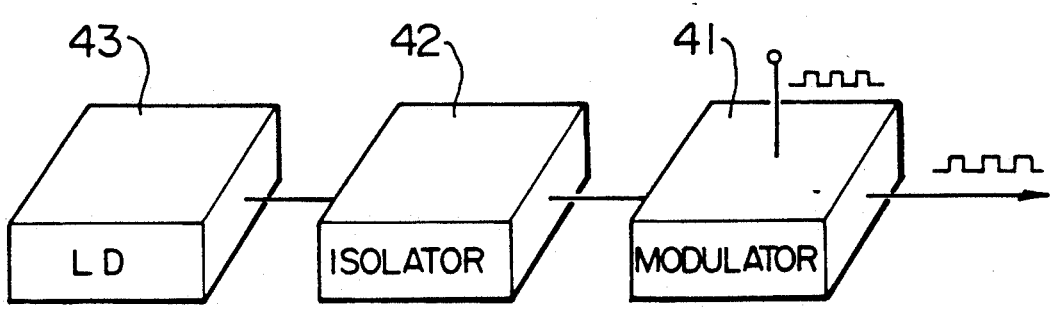
FIG. 5 is a view showing a prior art way to connect an optical isolator and a modulator.

When the combination of the electric field E, magnetic field H, propagation length l (which corresponds to z in the equation (12)) and propagation constant difference $\Delta\beta$ that satisfies the above equation (12) is obtained, the incident TE light polarized in the y-axis direction emerges as a linearly polarized light having an inclination angle of 45 degrees. Thus, an integrated-type isolator is achieved. The manner of integration with a semiconductor laser is the same as that shown in FIG. 2.

When the propagation constant difference $\Delta\beta$ is 10 rad/cm and the propagation length l is 1 mm, the angle $\theta_E$ of lead in phase due to the electrooptic effect and the Faraday rotation angle $\theta_F$ is as follows, by solving the equation (12).

$$\theta_E = 5 \text{rad/cm} = 286°/\text{cm}$$

$$\theta_F = 4.7 \text{rad/cm} = 269°/\text{cm}$$

If the Verdet constant V of CdMnTe is 0.1°/cm·Oe, a necessary magnitude of the magnetic field H is about 2.7 kOe which can be obtained from $H = \theta_F/V$ in the equation (5). This value can be achieved by a permanent magnet. Further, if the wavelength $\lambda$ of light is 0.8 $\mu$m, the refractive index n is 2.84 and the electrooptic coefficient $\gamma_{41}$ is $4.5 \times 10^{-10}$ cm/V, a needed magnitude of the electric field E is $1.2 \times 10^4$ V/cm which is calculated from $E = \lambda\theta_E/\pi n^3 \gamma_{41}$. When the distance between the two electrodes 67 and 68 in FIG. 9 is set to 3 $\mu$m, a needed voltage may be 3.6 V which is a value which can be achieved by circuits at the level of transistor-transistor logic (TTL).

From the above explanation it has been found that an integrated-type optical isolator of 1 mm propagation length can be realized by applying a magnetic field $H = 3$ kOe and a voltage of about 4 V.

Figure 10:
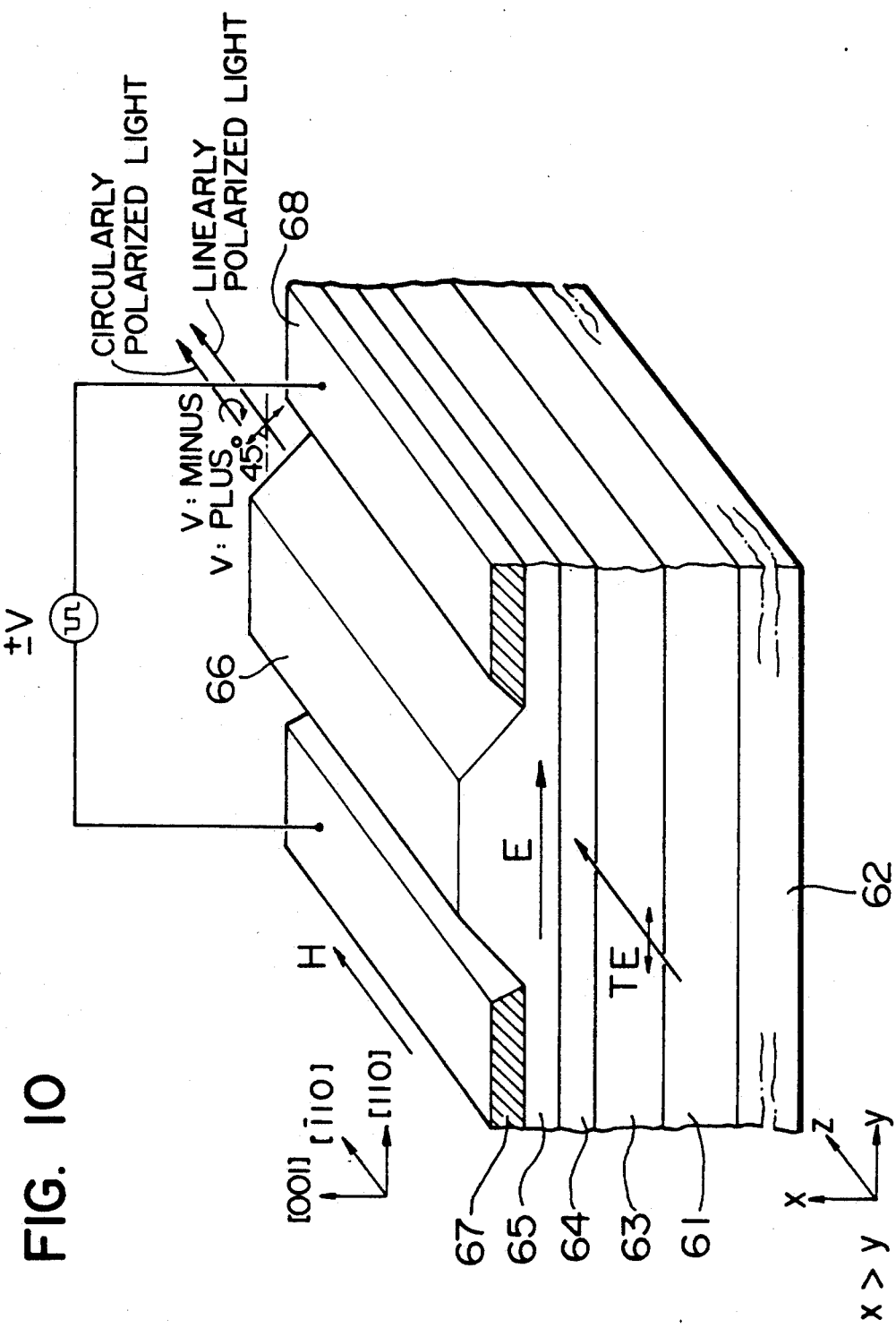
FIG. 10 is a schematic view of an embodiment of the optical modulator according to the present invention.

Next, FIG. 10 shows an embodiment of an optical modulator according to this invention. The structure of this embodiment is substantially the same as that of the embodiment in FIG. 9, but omits the permanent magnet 70, the polarizer 72, and the analyzer 74.

In this structure, electric fields E and $-E$ in the direction [110] can be applied by the elecrodes 67 and 68 using the voltage source $\pm V$. This electric field is switchable between the y-axis plus (+) and minus (−) directions according to switching signals.

Further, the magnetic field H is applied in the propagation direction of the channel 66 or direction of the [$\bar{1}$10] axis, and the relationship among the external fields E and H and the crystal axis of the waveguide is the same as that in FIG. 6.

The optical isolator function of this integrated-type optical modulator is achieved in the same manner as that in the embodiment of FIG. 9. The operation when the electric field $-E$ is applied has been discussed above in the explanation of the operating principles of the present invention. The manner of the integration of this embodiment is also the same as that in FIG. 2.

When the propagation constant difference $\Delta\beta$ is 10 rad/cm and the case of equation (12) is considered, the propagation length l which corresponds to z in the equation (12) becomes about 1.2 mm by solving the equation (12). When the Verdet constant V of CdMnTe is 0.1°/cm.Oe, a needed magnetic field H is calculated from the equation (5) to be about 2.9 kOe that is a value which can be realized by a permanent magnet. Further, when the wavelength $\lambda$ of light is 0.8 $\mu$m, the refractive index n is 2.84 and the electrooptic coefficient $\gamma_{41}$ is $4.5 \times 10^{-10}$ cm/V, a needed electric field E is calculated from the equation (4) and $E = \lambda\theta_E/\pi n^3\gamma_{41}$ is calculated to be $1.2 \times 10^4$ V/cm. If the distance between the electrodes 67 and 68 in FIG. 10 is 3 $\mu$m, a necessary voltage may be 3.6 V which is a value that can be satisfied by circuits at the level of TTL.

Figure 11A:
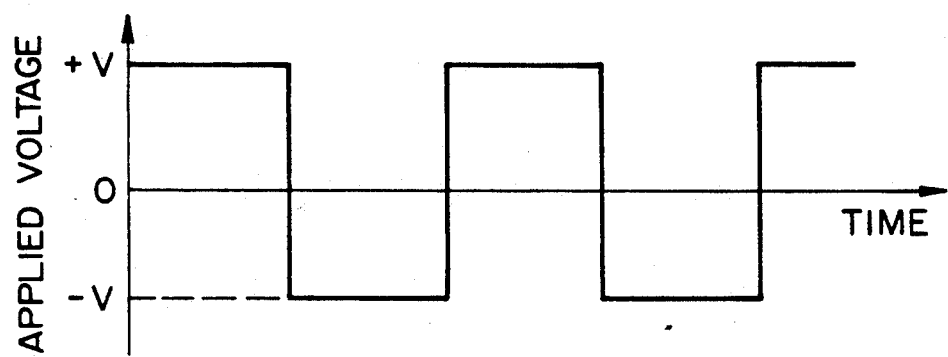
FIGS. 11A and 11B are views showing the relationship between a modulated voltage and an intensity of emerging light in the embodiment of FIG. 10.
Figure 11B:
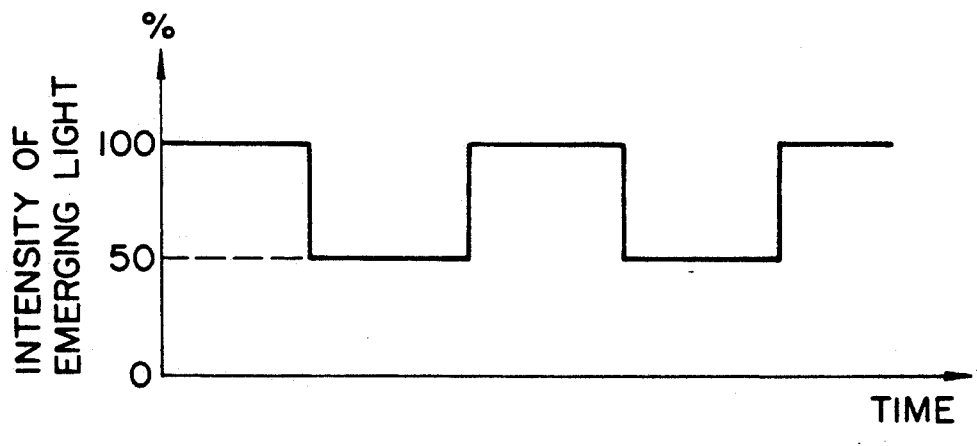

Thus, from the above explanation, it has been found that the integrated-type optical modulator is obtained by applying the magnetic field $H = 3$ kOe and the voltage of about 4 V, in which the propagation length is about 1 mm and the optical modulation as shown in FIG. 11B is performed by voltage switching between plus (+V) and minus (−V) as shown in FIG. 11A.

In the optical modulator of this invention, an external magnetic field (which is hard to modulate rapidly in view of the impedance), need not be modulated, light modulation of the order of GHz is possible because only modulation of a voltage of several V is needed. Further, there is no need to serially connect individual devices having the two functions of optical isolation and modulation, respectively, and the optical modulator of this invention is a device which is suitable for integration with semiconductor lasers. Thus, the device of this invention is expected to be widely utilized in optical communications and optical disc memories.

While there has been shown and described what are considered preferred embodiments of the present inventions, it will be obvious to those skilled in the art that various changes and modifications may be made therein without departing from the invention as defined by the claims.

What is claimed is:

1. A polarization state converting apparatus comprising:
   a waveguide comprising a magnetic semiconductor;
   means for applying a magnetic field to said waveguide in a first predetermined direction; and
   means for applying an electric field to said waveguide in a second predetermined direction;
   whereby a mode conversion is caused, via electrooptic and magnetooptic effects due to the electric and magnetic fields, to change the polarization state of light propagating through said waveguide.

2. A polarization-state converting apparatus according to claim 1, wherein said means for applying a magnetic field and said means for applying an electric field are operated to cause (1) a propagation constant difference $\Delta\beta$ between TE and TM waves to be substantially 10 rad/cm, (2) a propagation length l in said waveguide to be substantially 1 mm, (3) a magnetic field H to be between substantially 2.7 kOe and substantially 3.0 kOe, and (4) an electric field E to be substantially $1.2 \times 10^4$ V/cm.

3. An optical isolator comprising:
   a waveguide comprising a magnetic semiconductor;
   means for applying a magnetic field to said waveguide in a first predetermined direction; and
   means for applying an electric field to said waveguide in a second predetermined direction;
   whereby a mode conversion is caused via electrooptic and magnetooptic effects due to the electric and magnetic fields (while compensating for degradation of the mode conversion rate due to phase mismatch between light incident upon said waveguide and light emerging from said waveguide).

4. An optical isolator according to claim 3, wherein said waveguide has a zinc-blende structure and the second predetermined direction is a [110] direction in the zinc-blende structure.

5. An optical isolator according to claim 3, wherein said magnetic semiconductor comprises CdMnTe.

6. An optical isolator according to claim 3, wherein the mode conversion is performed between TE and TM light.

7. An optical isolator according to claim 3, wherein the first and second predetermined directions are orthogonal to each other.

8. An optical isolator according to claim 3, wherein said waveguide is fabricated on a GaAs (001) substrate.

9. An optical isolator according to claim 3, wherein said isolator is integrated with a semiconductor laser on a common substrate.

10. An optical isolator according to claim 3, further comprising a polarizer disposed on the side of light incidence of said waveguide and an analyzer disposed on the side of light emission of said waveguide.

11. An optical isolator according to claim 3, wherein said means for applying a magnetic field and said means for applying an electric field are operated to cause (1) a propagation constant difference $\Delta\beta$ between TE and TM waves to be substantially 10 rad/cm, (2) a propagation length l in said waveguide to be substantially 1 mm, (3) a magnetic field H to be between substantially 2.7 kOe and substantially 3.0 kOe, and (4) an electric field E to be substantially $1.2 \times 10^4$ V/cm.

12. An optical modulator comprising:
a waveguide comprising a magnetic semiconductor;
means for applying a constant magnetic field to said waveguide in a first predetermined direction; and
means for applying an electric field to said waveguide in a second predetermined direction, the electric field being modulated according to a modulation signal;
whereby a mode conversion is caused, via electrooptic and magnetooptic effects due to the electric and magnetic fields, to perform optical modulation of light emerging from said waveguide, and to perform optical isolation while compensating for degradation of the mode conversion rate due to phase mismatch between light incident upon said waveguide and light emerging from said waveguide.

13. An optical modulator according to claim 12, wherein said means for applying the electric field switches the electric field between a plus and a minus of the same magnitude, and wherein a linearly polarized light incident upon said waveguide is rotated by 45 degrees to emerge from said waveguide as a linearly polarized light whose polarization plane is rotated by 45 degrees when the electric field is switched to plus, and the linearly polarized incident light is converted to emerge from said waveguide as circularly polarized light when the electric field is switched to minus.

14. An optical modulator according to claim 12, wherein said waveguide has a zinc-blende structure and the second predetermined direction is a [110] direction in the zinc-blende structure.

15. An optical modulator according to claim 12, wherein said magnetic semiconductor comprises CdMnTe.

16. An optical modulator according to claim 12, wherein the mode conversion is performed between TE and TM light.

17. An optical modulator according to claim 12, wherein the first and second predetermined directions are orthogonal to each other.

18. An optical modulator according to claim 12, wherein said waveguide is fabricated on a GaAs (001) substrate.

19. An optical modulator according to claim 12, wherein said modulator is integrated with a semiconductor laser on a common substrate.

20. An optical modulator according to claim 12, further comprising a polarizer disposed on the side of light incidence of said waveguide and an analyzer disposed on the side of light emission of said waveguide.

21. An optical modulator according to claim 12, wherein said means for applying a magnetic field and said means for applying an electric field are operated to cause (1) a propagation constant difference $\Delta\beta$ between TE and TM waves to be substantially 10 rad/cm, (2) a propagation length l in said waveguide to be substantially 1 mm, (3) a magentic field H to be between substantially 2.7 kOe and substantially 3.0 kOe, and (4) an electric field E to be substantially $1.2 \times 10^4$ V/cm.

* * * * *

UNITED STATES PATENT AND TRADEMARK OFFICE
CERTIFICATE OF CORRECTION

PATENT NO. : 5,245,465

DATED : September 14, 1993

INVENTOR(S) : YASUO TOMITA ET AL.

It is certified that error appears in the above-identified patent and that said Letters Patent is hereby corrected as shown below:

On The Title Page:

"[75] Inventors: Yasuo Tomita, Yokohama; Hitoshi Oda; Masahiro Okuda, both of Sagamihara, all of Japan"

should read as follows:

--[75] Inventors: Hitoshi Oda, Sagamihara; Yasuo Tomita, Yokohama; and Masahiro Okuda, Sagamihara, all of Japan--.

UNITED STATES PATENT AND TRADEMARK OFFICE
CERTIFICATE OF CORRECTION

PATENT NO. : 5,245,465

DATED : September 14, 1993

INVENTOR(S) : YASUO TOMITA ET AL.

It is certified that error appears in the above-identified patent and that said Letters Patent is hereby corrected as shown below:

COLUMN 3

Line 50, in the equation (2-8), "$dA_2/d\zeta=(\omega^2\mu)$" should read --$dA_2/d\zeta=(i\omega^2\mu)$--.

COLUMN 6

Line 45, in equation (4), "$\Delta n - n^3 \cdot \gamma_{41} \cdot E/2$" should read --$\Delta n = n^3 \cdot \gamma_{41} \cdot E/2$--;

Line 51, "contstant" should read --constant--; and

Line 59, in equation (6), "$A_{TM}(Z)$" should read --$A_{TM}(z)$--.

UNITED STATES PATENT AND TRADEMARK OFFICE
CERTIFICATE OF CORRECTION

PATENT NO. : 5,245,465

DATED : September 14, 1993

INVENTOR(S) : YASUO TOMITA ET AL.

It is certified that error appears in the above-identified patent and that said Letters Patent is hereby corrected as shown below:

COLUMN 10

Line 37, "polarization state" should read --polarization-state--; and
Line 67, "(while" should read --while--.

COLUMN 11

Line 2, "waveguide)." should read --waveguide.--.

Signed and Sealed this

Twenty-first Day of June, 1994

Attest:

BRUCE LEHMAN

Attesting Officer    Commissioner of Patents and Trademarks